(12) United States Patent
Seitz et al.

(10) Patent No.: US 12,008,635 B2
(45) Date of Patent: Jun. 11, 2024

(54) COMMON ORDERING INTERFACE PORTAL FOR OBTAINING THIRD-PARTY SERVICES AND CONTENT

(71) Applicant: T-Mobile USA, Inc., Bellevue, WA (US)

(72) Inventors: Nicholas Seitz, Seattle, WA (US); Michael Burbo, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 313 days.

(21) Appl. No.: 16/691,456

(22) Filed: Nov. 21, 2019

(65) Prior Publication Data

US 2021/0158431 A1  May 27, 2021

(51) Int. Cl.
| | |
|---|---|
| *H04W 8/20* | (2009.01) |
| *G06F 3/0484* | (2022.01) |
| *G06Q 20/10* | (2012.01) |
| *G06Q 20/12* | (2012.01) |
| *G06Q 30/0207* | (2023.01) |
| *G06Q 30/0601* | (2023.01) |
| *H04L 67/306* | (2022.01) |
| *H04L 67/53* | (2022.01) |
| *H04W 4/50* | (2018.01) |
| *G06F 3/0481* | (2022.01) |

(52) U.S. Cl.
CPC ....... *G06Q 30/0643* (2013.01); *G06Q 20/102* (2013.01); *G06Q 20/1235* (2013.01); *G06Q 20/127* (2013.01); *G06Q 30/0224* (2013.01); *H04L 67/306* (2013.01); *H04L 67/53* (2022.05); *H04W 4/50* (2018.02); *H04W 8/20* (2013.01); *G06F 3/0481* (2013.01); *G06F 3/0484* (2013.01)

(58) Field of Classification Search
USPC ........................................................ 715/27.2
See application file for complete search history.

(56) References Cited

U.S. PATENT DOCUMENTS

| | | | | |
|---|---|---|---|---|
| 10,685,392 | B1 * | 6/2020 | Loh ..................... | G06Q 30/0623 |
| 2007/0299725 | A1 * | 12/2007 | Boyer ................ | G06Q 30/0213 |
| | | | | 705/14.15 |
| 2010/0114739 | A1 | 5/2010 | Johnston | |
| 2010/0153997 | A1 * | 6/2010 | Baumgartner ... | H04N 21/47202 |
| | | | | 725/39 |
| 2012/0109882 | A1 * | 5/2012 | Bouse ................... | H04L 67/306 |
| | | | | 707/607 |
| 2012/0158514 | A1 * | 6/2012 | Aldrey ............... | G06Q 30/0631 |
| | | | | 705/14.66 |

(Continued)

*Primary Examiner* — Henry Orr

(57) ABSTRACT

A universal subscription platform may determine whether information for one or more third-party services or one or more third-party media content files are to be presented via the common ordering interface portal based at least on a network subscription plan of a user with a wireless carrier network. In response to the network subscription plan being a first subscription plan, the universal subscription platform may provide the information on the one or more third-party services for presentation via the common ordering interface portal. In response to the network subscription plan being a second subscription plan, the universal subscription platform may provide the information on the one or more third-party media content files for presentation via the common ordering interface portal.

18 Claims, 10 Drawing Sheets

(56) References Cited

U.S. PATENT DOCUMENTS

| | | | |
|---|---|---|---|
| 2013/0138485 A1* | 5/2013 | Zou | G06Q 30/04 |
| | | | 705/14.1 |
| 2013/0346302 A1* | 12/2013 | Purves | G06Q 20/108 |
| | | | 705/40 |
| 2014/0279259 A1* | 9/2014 | Harman | G06Q 30/0209 |
| | | | 705/26.62 |
| 2017/0201850 A1* | 7/2017 | Raleigh | G06F 3/0482 |
| 2018/0174075 A1* | 6/2018 | Manoharan | G06T 11/206 |
| 2020/0184434 A1* | 6/2020 | Evans | G06Q 20/407 |

* cited by examiner

COMMON ORDERING INTERFACE PORTAL FOR OBTAINING THIRD-PARTY SERVICES AND CONTENT

BACKGROUND

In addition to subscribing to recurring real-world services, consumers are increasingly becoming regular subscribers of online services. For example, real-world services may include a monthly fitness club membership, a recurring in-home meal kit delivery service, a recurring home cleaning service, etc. Online services may include online media access services that enable consumers to access digital content, such as movies, television series, and online interactive games. Consumers may use such online media access services via user devices of various form factors, such as a smartphone, a tablet computer, a smart television set, a laptop computer, or a desktop computer. Since such real-world and online services are provided by a variety of service providers, a consumer often has to set up a user account with each service provider. The setup of a user account with a service provider may involve the disclosure of personal identification information, contact information, authentication information, and billing information to the service provider. Accordingly, a consumer may end up establishing a large number of individual user accounts with multiple service providers. Such a large number of user accounts may be difficult for a user to track and manage, as well as lead to a greater risk of identity theft due to malicious activities, such as hacking and phishing scams.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
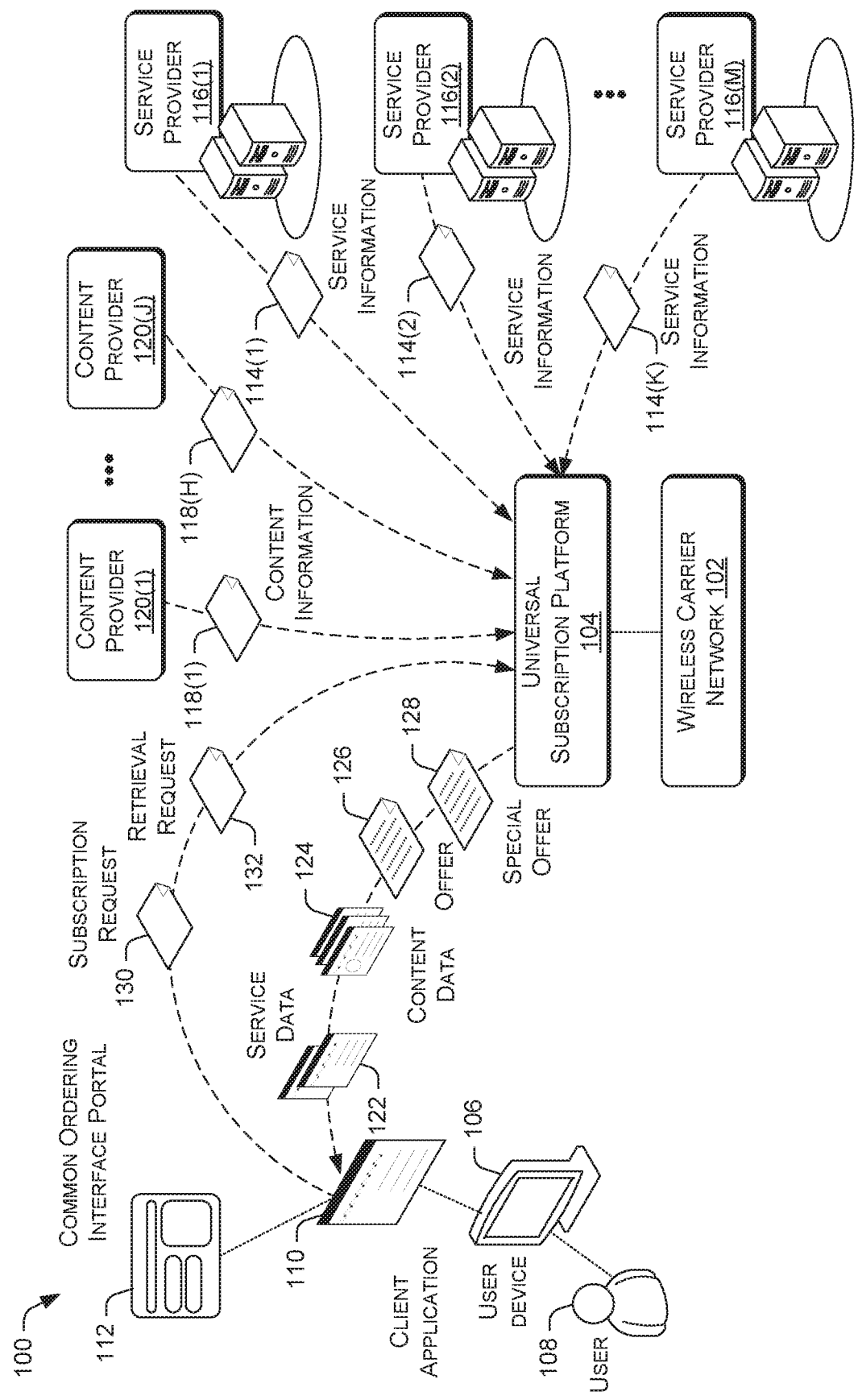
FIG. 1 illustrates an example architecture of a universal subscription platform that enables a user to manage subscriptions to multiple third-party real-world and online services using a common ordering interface portal.

This disclosure is directed to techniques that enable a subscriber to start and stop subscriptions to multiple third-party real-world services and online services via a common ordering interface portal. For example, real-world services may include a monthly fitness club membership, a recurring in-home meal kit delivery service, a recurring home cleaning service, etc. Online services may include online media access services that enable consumers to access digital content, such as movies, television series, and online interactive games. In various embodiments, the common ordering interface portal may be provided by a universal subscription platform of a wireless carrier network. The common ordering interface portal enables a user to input a start date for starting a subscription to a third-party service and an end date for terminating the subscription to the service. In various embodiments, the user may be a subscriber of a wireless carrier network. In turn, the universal subscription platform may automatically subscribe to the service on behalf of the user when the start date arrives, and automatically cancel the subscription to the third-party service for the user on the end date.

In some embodiments, the common ordering interface portal may provide various third-party service or third-party content availability options to a user based on the type of subscription plan that the user has with the wireless carrier network. For example, a user with a postpaid subscription plan to the telecommunication services of the wireless carrier network may be provided with more available third-party service or third-party content access options than a user with a prepaid subscription. Alternatively, or concurrently, the common ordering interface portal may provide different third-party service availability options based on the demographic information of the user. Additionally, the common ordering interface portal may provide customized offers of third-party services or third-party content to a user based on a purchase history of the user or popularities of specific services or content with other users.

The universal subscription platform may provide a user with several advantages. For example, the platform offers a one-stop shop for the user to manage the subscription-based services of the user, in which the services may include both real-world services and online services. In various embodiments, the universal subscription platform may offer the user the ability to pay for multiple subscription services using a payment arrangement that is pre-established with the wireless carrier network. In other words, a mobile network operator (MNO) of the wireless carrier network may be responsible for obtaining payment for a third-party service or content from the user and then sending the payment to the third-party provider of the service or the content. In this way, the user may enjoy the convenience of paying a single entity rather than making multiple payment arrangements with multiple entities. In some embodiments, a user who is a primary account holder that has a payment account with the MNO may have the ability to control the services or content subscribed to by multiple secondary users. For example, a parent may control access by a child to online services and content that are available through the universal subscription platform. In some instances, the MNO may charge a service fee to users for handling the payment of third-party service and content providers. In other instances, the MNO may offer the payment service free of charge to specific users as a privilege associated with being a subscriber of the wireless carrier network. The techniques described herein may be implemented in a number of ways. Example implementations are provided below with reference to the following figures.

Example Architecture

FIG. 1 illustrates an example architecture 100 of a universal subscription platform that enables a user to manage subscriptions to multiple third-party real-world and online services using a common ordering interface portal. The architecture 100 may include a wireless carrier network 102 that controls a universal subscription platform 104. The wireless carrier network 102 may operate a wireless carrier network. The wireless carrier network may provide a wide range of mobile communication services, as well as ancillary services and features, to subscribers and associated mobile device users. The wireless carrier network may be implemented using multiple interconnected networks. In various embodiments, the wireless carrier network may include multiple Radio Access Networks (RANs). The RANs may be connected to each other via regional ground networks. In turn, the regional ground networks may be connected to a core network by a wide area network (WAN). Each regional portion of the wireless carrier network may include one or more RANs and a regional circuit and/or packet-switched network and associated signaling network facilities. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), and/or so forth. In some embodiments, the core network of the wireless carrier network may be accessed via wired or wireless local area networks (LANs). For example, a wireless local area network may be a network that is established using Wi-Fi or Bluetooth standards and hardware.

In various embodiments, the wireless carrier network may provide telecommunication services to user devices of wireless carrier network subscribers, such as the user device 106 of the user 108. In some embodiments, the user device 106 may be a large screen user device, such as a smart television set, a smart video projector, a desktop computer, or a similar non-portable user device. Alternatively, the user device 106 may a portable user device, such as a smartphone, a smartwatch, a laptop computer, a tablet computer, a vehicle infotainment console, or a similar portable device. The user device 106 may be equipped with a client application 110 that is configured to display a common ordering interface portal 112 provided by the universal subscription platform 104. The communication subscription interface portal is an interface portal that enables the user 108 to subscribe to multiple third-party services and access multiple third-party content. The third-party service may include real-world services and online services. For example, the real-world services may include a monthly fitness club membership, a recurring in-home meal kit delivery service, a recurring home cleaning service, etc. The online services may include online media access services that enable consumers to access third-party content. The third-party content may include digital content, such as movies, television series, and online interactive games. In some embodiments, the common ordering interface portal 112 may be a website and the client application 110 may be a web browser that displays the web portal. In other embodiments, the common ordering interface portal 112 may be a web service that is accessible via a dedicated client application 110.

The universal subscription platform 104 may aggregate service information 114(1)-114(K) regarding services that are provided by the third-party service providers 116(1)-116 (M). In various embodiments, the information for a service may include a description of the service, a subscription fee for the service, a minimum subscription duration for the service, a graphical representation of the service provider and/or the service, subscription terms and conditions for the subscription to the service, special offers or incentives associated with signing up for a subscription, and/or so forth. In at least one embodiment, the information may indicate that the service is offered at no cost to the user 108 because of a network subscription plan that the user 108 has with the wireless carrier network 102. In some instances, the universal subscription platform 104 may receive corresponding service information from a server of a particular service provider. The server of the service provider may communicate with the universal subscription platform 104 via a network. The network may include the wireless carrier network 102, a local area network (LAN), a larger network such as a wide area network (WAN), and/or a collection of networks, such as the Internet. In other instances, the universal subscription platform 104 may provide an online portal that enables an administrator of a service provider to manually input information into a data store of the universal subscription platform 104.

The universal subscription platform 104 may aggregate content information 118(1)-118(H) regarding media content files that are provided by third-party content providers 120(1)-120(J). In various embodiments, the information for a media content file may include a description of the media content file, a consumption fee for the media content file, a graphical representation of the media content file, special offers or incentives associated with the media content file, an access or download link of the media content file, and/or so forth. In at least one embodiment, the information may indicate that the media content file is offered at no cost to the user 108 because of a network subscription plan that the user 108 has with the wireless carrier network 102. In some instances, the universal subscription platform 104 may receive corresponding content information from a server of a content provider. The server of the content provider may communicate with the universal subscription platform 104 via a network. The network may include the wireless carrier network 102, a local area network (LAN), a larger network such as a wide area network (WAN), and/or a collection of networks, such as the Internet. In other instances, the universal subscription platform 104 may provide an online portal that enables an administrator of a content provider to manually input information into a data store of the universal subscription platform 104.

In turn, the universal subscription platform 104 may provide the service information of one or more services as service data 122 to the client application 110 for presentation via the common ordering interface portal 112. Alternatively, or concurrently, the platform may provide content data 124 that includes the content information of one or more media content files to the client application 110. In this way, the user 108 may be presented with information on specific services and/or content files that may be of interest to the user 108. In various embodiments, the universal subscription platform 104 may select specific service information and/or specific content information for the user 108 based on one or more corresponding user characteristics. These user characteristics may include a type of the network subscription plan that the user 108 has with the wireless carrier network 102, a prior subscription history of the user 108, a prior content download or purchase history of the user 108, a prior service and/or content browser history of the user 108, demographic parameters of the user 108, and/or so forth. The demographic parameters of the user 108 may include data such as age, gender, education level, family size, credit worthiness of the user 108, etc., which the user 108 consented to provide to the wireless carrier network 102.

Accordingly, a user with a postpaid subscription plan may be provided with certain service information of services and/or content information of content that are otherwise unavailable to a user with a prepaid subscription. In another example, a first user that falls into a first age range may be provided with the service information for a first service, while a second user that falls into a second age range may be provided with the service information for a second service. Such filtering by age may allow the universal subscription platform to present age-appropriate service or media content files to the user 108. In an additional example, the universal subscription platform 104 may provide content information for media content files of a second season of a television show to a user based on the user having previously downloaded or purchased a first season of the television show.

In other embodiments, the universal subscription platform 104 may provide information related to a bundle of services and/or media content files associated with an offer 126 to the user 108. In one instance, a bundle may contain services and/or media content files that are curated by an additional user. For example, the additional user may have a relationship with the user 108, such as a family member or a friend, and the additional user has consented to sharing the corresponding bundle with the user 108. In another example, the additional user may be a well-known celebrity or media personality that decided to share the corresponding bundle with the public or selected members of the public. In additional embodiments, the universal subscription platform 104 may provide a special offer 128 that includes information on specific services and/or media content files to the user 108. For example, the user 108 may have previously purchased season one of a particular television show. Accordingly, the universal subscription platform 104 may provide a discounted offer that allows the user 108 to purchase season two of the particular television show at a discounted price with a predetermined time period. In another example, the user 108 may have joined a fitness club for a year, and the universal subscription platform 104 may provide an incentive offer that allows the user 108 to renew a membership to the fitness club at a discount for another year if the renewal is completed within a certain time period.

The common ordering interface portal 112 may present the information on the services and/or the media content files to the user 108 via various presentation formats. In some examples, the services and media content files may be presented as cover flows, in which the user 108 may scroll through a set of icons that represent the services and/or a set of icons that represent the media content files in order to select an item of interest. In other examples, the icons that represented the sets of services and/or media content files may be accompanied by navigation controls, such as a slider, a scroll bar, and/or so forth. Such navigation controls may enable the user to browse through the icons to select an item of interest. The selection of an item of interest may trigger the common ordering interface portal 112 to provide information regarding a particular service or a particular media content file. In the case of a service, the common ordering interface portal 112 may further provide a subscription control that enables the user 108 to input a start date and an end date for a subscription to the service, and then activate the subscription to the service. In the case of a media content file, the common ordering interface portal 112 may provide a retrieval control that enables the user 108 to purchase and retrieve the media content file, or to retrieve the media content file free of charge. The retrieval of the media content file may include streaming the media content file or downloading the media content file for later viewing.

Following a subscription initiation for a service, the client application 110 may use the common ordering interface portal 112 to send a subscription request 130 to the universal subscription platform 104. The subscription request 130 may include a service identifier of the service, a start date and end date for a subscription to the service, a fee amount for the service, payment term information (e.g., a lump sum payment or a periodic recurring charge, prepaid or postpaid, etc.), service offer or discount information, a user identifier of the user 108, a device identifier of the user device 106, and/or so forth. The device identifier of the user device 106 may be a Mobile Station International Subscriber Directory Number (MSISDN), an International Mobile Equipment Identity (IMEI), an International Mobile Subscriber Identity (IMSI), a Mobile Equipment Identifier (MEID) in the form of an Electronic Serial Number (ESN), and/or the like.

At this point, the universal subscription platform 104 may determine whether a cost of the subscription to the service for the subscription period denoted by the start and end dates is covered by the benefits associated with a network subscription plan of the user 108 with the wireless carrier network 102. For example, the network subscription plan may offer free access to certain third-party services. Thus, if the universal subscription platform 104 determines that the cost of the subscription to the service is covered by the network subscription plan, the universal subscription platform 104 may append a metadata tag to the subscription request 130. The modified subscription request 130 is then sent by the universal subscription platform 104 to a point-of-sale (POS) function of a corresponding service provider. The metadata tag may indicate that the subscription to the service is covered by the wireless carrier network 102. For example, the metadata tag may cause the POS function to bill the cost of the service during the subscription period to an account of the wireless carrier network 102, provide the service to the user 108 using one of the existing service seats that the MNO of the wireless carrier network 102 purchased or otherwise obtained by from the service provider, apply a prepaid credit or payment amount from an account of the MNO to defray the cost of the service for the subscription period, and/or so forth.

However, in other instances, the universal subscription platform 104 may determine that the cost of the subscription to the service is not covered by the network subscription plan. In such instances, the universal subscription platform 104 may directly forward the subscription request 130 to the POS function of the corresponding service provider. The POS function may calculate a subscription cost for the service and send the calculated subscription cost to the universal subscription platform 104. The universal subscription platform 104 then presents the subscription cost via the common ordering interface portal 112 along with a request for the user 108 to input a user consent to the subscription cost. Following an input of the user consent that is forwarded to the POS function by the universal subscription platform 104, the POS function may respond with a subscription acknowledgment if the subscription request is accepted by the POS function. In various embodiments, the POS function of a service provider may send the subscription acknowledgment to the universal subscription platform 104. In turn, the universal subscription platform 104 may send the subscription acknowledgment to the client application 110 for display via the common ordering interface portal 112. In some embodiments, the subscription acknowledgment may include information such as the service start date, the service end date, instructions for obtaining the service, terms and conditions for the service, instructions for obtaining additional information about the service, and/or so forth.

Following the receipt of the subscription acknowledgment, the universal subscription platform 104 may forward the subscription request 130 to a billing function (e.g., an Online Charging System (OCS)) of the wireless carrier network 102 when the subscription to the service is not free to the user 108. In turn, the billing function of the wireless carrier network 102 may charge a subscriber account of the user 108 the subscription fee for the service according to the payment term information. Subsequently, the billing function may send a fee payment to the service provider according to a pre-established arrangement between the wireless carrier network 102 and the service provider. In alternative instances, the billing function of the wireless carrier network 102 may wait for a billing request from the POS function of the corresponding service provider. The billing request may include an identifier of a service, a description of the service, an amount of fee to be paid for the service, a due date for sending the payment, and/or so forth. In turn, the billing function of the wireless carrier network 102 may charge a subscriber account of the user 108 the fee according to the billing request.

Likewise, following a retrieval initiation for a media content file, the client application 110 may use the common ordering interface portal 112 to send a retrieval request 132 to the universal subscription platform 104. The retrieval request 132 may include a file identifier of the media content file, a consumption fee amount for the media content file (e.g., whether the media content file is being offered for free or at a cost), payment term information, a user identifier of the user 108, a device identifier of the user device 106, and/or so forth.

At this point, the universal subscription platform 104 may determine whether a cost for the retrieval of the media content file is covered by the benefits associated with a network subscription plan of the user 108 with the wireless carrier network 102. For example, the network subscription plan may offer free downloads of certain third-party content. Thus, if the universal subscription platform 104 may determine that the cost of the media content file retrieval is covered by the network subscription plan, the universal subscription platform 104 may append a metadata tag to the retrieval request 132. The modified retrieval request 132 is then sent by the universal subscription platform 104 to a point-of-sale (POS) function of a corresponding content provider. The metadata tag may indicate that the consumption cost of the media content file is covered by the wireless carrier network 102. For example, the metadata tag may cause the POS function to bill the cost of the media content file to an account of the wireless carrier network 102, apply a prepaid credit or payment amount from an account of the MNO to defray the cost, and/or so forth.

However, in other instances, the universal subscription platform 104 may determine that the cost of the media content file retrieval is not covered by the network subscription plan. In such instances, the universal subscription platform 104 may directly forward the retrieval request 132 to a point-of-sale (POS) function of a corresponding content provider. The POS function may calculate a consumption cost for the media content file and send the calculated subscription cost to the universal subscription platform 104. The universal subscription platform 104 then presents the consumption cost via the common ordering interface portal 112 along with a request for the user 108 to input a user consent to the consumption cost. Following an input of the user consent that is forwarded to the POS function by the universal subscription platform 104, the POS function may respond with a retrieval acknowledgment if the retrieval request is accepted by the POS function. In various embodiments, the POS function of a content provider may send the retrieval acknowledgment to the universal subscription platform 104. In turn, the universal subscription platform 104 may send the retrieval acknowledgment to the client application 110 for display by the common ordering interface portal 112. In some embodiments, the retrieval acknowledgment may include information such as terms and conditions for the retrieval or consumption of the media content file, instructions for obtaining access to the media content file, a link to the media content profile, and/or so forth.

Following the receipt of the retrieval acknowledgment, the universal subscription platform 104 may forward the retrieval request 132 to a billing function (e.g., an Online Charging System (OCS)) of the wireless carrier network 102 if the media content file is not free to the user 108. In turn, the billing function of the wireless carrier network 102 may charge a subscriber account of the user 108 a consumption fee for the media content file according to the payment term information. Subsequently, the billing function may send a fee payment to the service provider according to a pre-established arrangement between the wireless carrier network 102 and the content provider. In alternative instances, the billing function of the wireless carrier network 102 may wait for a billing request from the POS function of the corresponding content provider. The billing request may include an identifier of a media content file, a description of the media content file, an amount of consumption fee to be paid for the media content file, a due date for sending the payment, and/or so forth. In turn, the billing function of the wireless carrier network 102 may charge a subscriber account of the user 108 the consumption fee according to the billing request.

In some embodiments, the subscriber account of the user 108 may be tied to a financial account that the user 108 has with a third-party financial institution, such as a deposit account, a credit card account, or a debit card account. Accordingly, the user 108 may arrange for payment to the subscriber account from the financial account. In other embodiments, the subscriber account may be a deposit account that the user 108 established with the MNO in which the user 108 has deposited monetary funds to pay the fees due to a service provider or a content provider.

Example User Device Components

Figure 2:
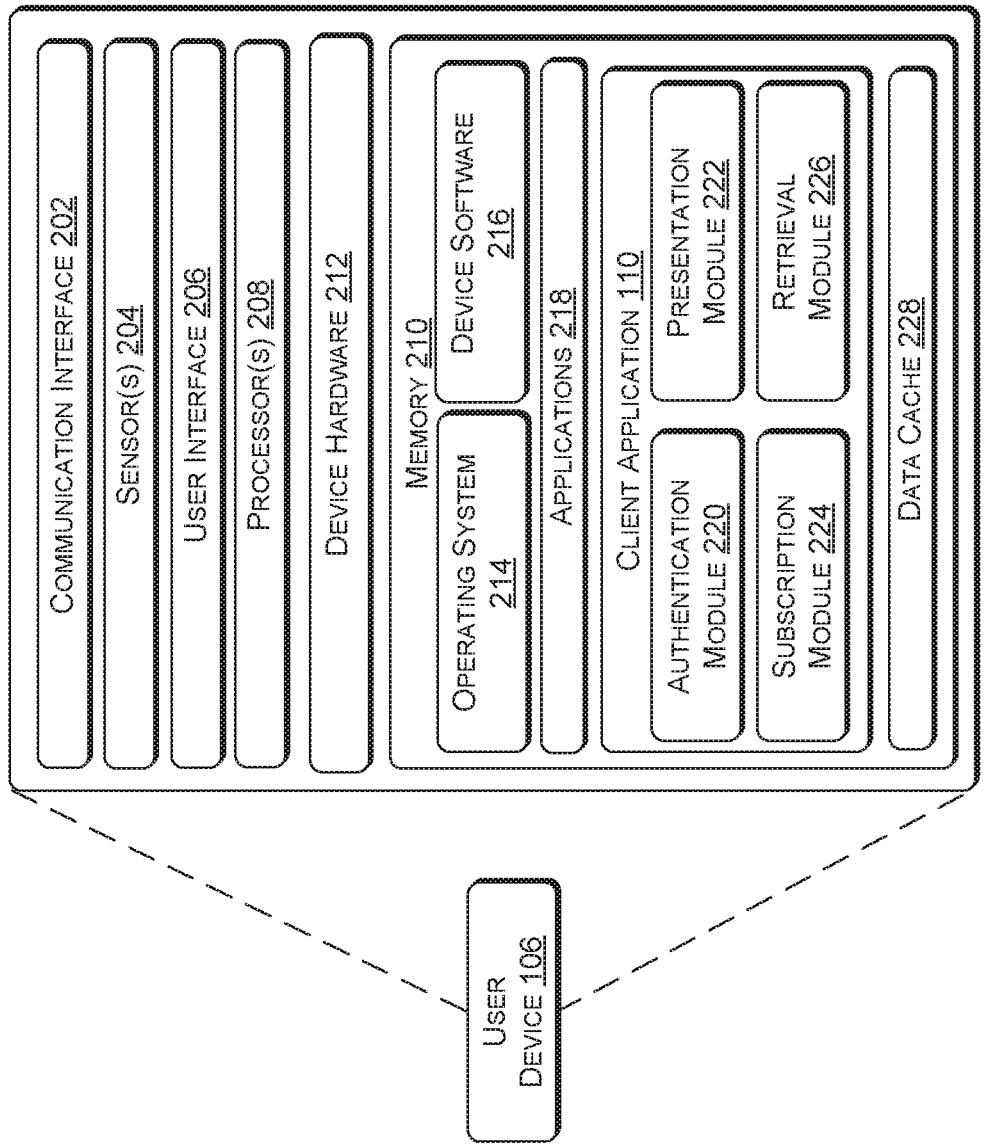
FIG. 2 is a block diagram showing various components of a user device that supports the management of subscription to multiple third-party real-world and online services using a common ordering interface portal.

FIG. 2 is a block diagram showing various components of a user device that supports the management of subscription to multiple third-party real-world and online services using a common ordering interface portal. The user device 106 may include a communication interface 202, one or more sensors 204, a user interface 206, one or more processors 208, memory 210, and device hardware 212. The communication interface 202 may include wireless and/or wired communication components that enable the electronic device to transmit or receive voice or data communication via the wireless carrier network, as well as other telecommunication and/or data communication networks. The sensors 204 may include a proximity sensor, a compass, an accelerometer, biometric sensors, cameras, and/or a global positioning system (GPS) sensor, among other appropriate sensors. The proximity sensor may detect movement of objects that are proximate to the user device 106. The compass, the accelerometer, and the GPS sensor may detect orientation, movement, and geolocation of the user device 106. The cameras may capture images of the environment around the user device 106.

The user interface 206 may enable a user to provide input and receive output from the user device 106. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

The memory 210 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The device hardware 212 may include a modem that enables the user device 106 to perform telecommunication and data communication with a network. The device hardware 212 may further include signal converters, antennas, hardware decoders and encoders, graphics processors, a universal integrated circuit card (UICC) or an embedded UICC (eUICC), and/or the like that enable the user device 106 to execute applications and provide telecommunication and data communication functions. In various embodiments, the user device 106 may communicate with the universal subscription platform 104 via a network. The network may include the wireless carrier network 102, a LAN, a larger network such as a WAN, and/or a collection of networks, such as the Internet.

The one or more processors 208 and the memory 210 of the user device 106 may implement an operating system 214, device software 216, one or more applications 218, and a client application 110. Such software may include routines, program instructions, objects, and/or data structures that are executed by the processors 208 to perform particular tasks or implement particular abstract data types.

The operating system 214 may include components that enable the user device 106 to receive and transmit data via various interfaces (e.g., user controls, communication interface 202, and/or memory input/output devices). The operating system 214 may also process data using the one or more processors 208 to generate output based on input that is received via the user interface 206. For example, the operating system 214 may provide an execution environment for the execution of the applications 218. The operating system 214 may include a presentation component that presents the output (e.g., display the data on an electronic display, store the data in memory, transmit the data to another electronic device, etc.).

The operating system 214 may include an interface layer that enables applications to interface with the modem and/or the communication interface 202. The interface layer may comprise public APIs, private APIs, or a combination of both public APIs and private APIs. Additionally, the operating system 214 may include other components that perform various other functions generally associated with an operating system. The device software 216 may include software components that enable the user device to perform functions. For example, the device software 216 may include basic input/output system (BIOS), bootrom, or a bootloader that boots up the user device 106 and executes the operating system 214 following power-up of the device.

The applications 218 may include applications that provide utility, entertainment, and/or productivity functionalities to a user of the user device 106. For example, the applications 218 may include telephony applications, electronic mail applications, remote desktop applications, web browser applications, navigation applications, office productivity applications, multimedia streaming applications, an online shopping application, and/or so forth.

The client application 110 may include an authentication module 220, a presentation module 222, a subscription module 224, and a retrieval module 226. The authentication module 220 may enable a user to create or submit login credentials to establish and access a subscriber account with the universal subscription platform 104. The login credentials may include a user identifier, a user password, user biometric data, and/or so forth. In some embodiments, the wireless carrier network 102 may share subscriber account information with the universal subscription platform 104. Accordingly, the user may use the login credentials previously established with the wireless carrier network 102 to access services provided by the universal subscription platform 104.

The presentation module 222 may present a common ordering interface portal, such as the common ordering interface portal 112. In some embodiments, the presentation module 222 may arrange the display of available services and/or content on the common ordering interface portal according to configuration settings inputted by the user. For example, the presentation module 222 may display the various services and/or content using a cover flow of icons, a scrollable column or row of icons, etc. The services and/or content may be presented in ascending or descending order according to popularity, dates of release, cost of service or media content file, relevance to an inputted search term, alphabetically by name, and/or so forth. The presentation module 222 may surface layers of service information for a service or content information for a media content file as a user interfaces with a visual representation of the corresponding service or the corresponding media content file.

For example, the presentation module 222 may initially present an icon that represents an item (e.g., a service or a media content file), a name of the item, and a cost of the item. However, as the user activates additional controls (buttons, links, etc.), the presentation module 222 may surface more and more information about the item.

The subscription module 224 may receive a selection of a service that the user for which the user desires to subscribe. The selection of the service may include a subscription start time and a subscription end time. In turn, the subscription module 224 may generate a subscription request, such as the subscription request 130, for forwarding to the universal subscription platform 104. In at least one instance, the subscription module 224 may further present a request for a user to consent to a payment of a subscription fee under the direction of the universal subscription platform 104. Likewise, the retrieval module 226 may receive a selection of a media content file for which the user desires to consume. In turn, the retrieval module 226 may generate a retrieval request, such as the retrieval request 132, for forwarding to the universal subscription platform 104. In at least one instance, the subscription module 224 may further present a request for a user to consent to a payment of a consumption fee under the direction of the universal subscription platform 104. In some embodiments, the subscription module 224 or the retrieval module 226 may request an additional authentication credential prior to transmitting the corresponding request to the universal subscription platform 104. Such additional authentication may be a part of a parental control mechanism or a digital wallet control mechanism of the common ordering interface portal 112. However, in embodiments in which the common ordering interface portal 112 is a website, the functions of the modules 220-226 may be performed by services on a computing node that hosts the website.

Example Computing Node Components

Figure 3:
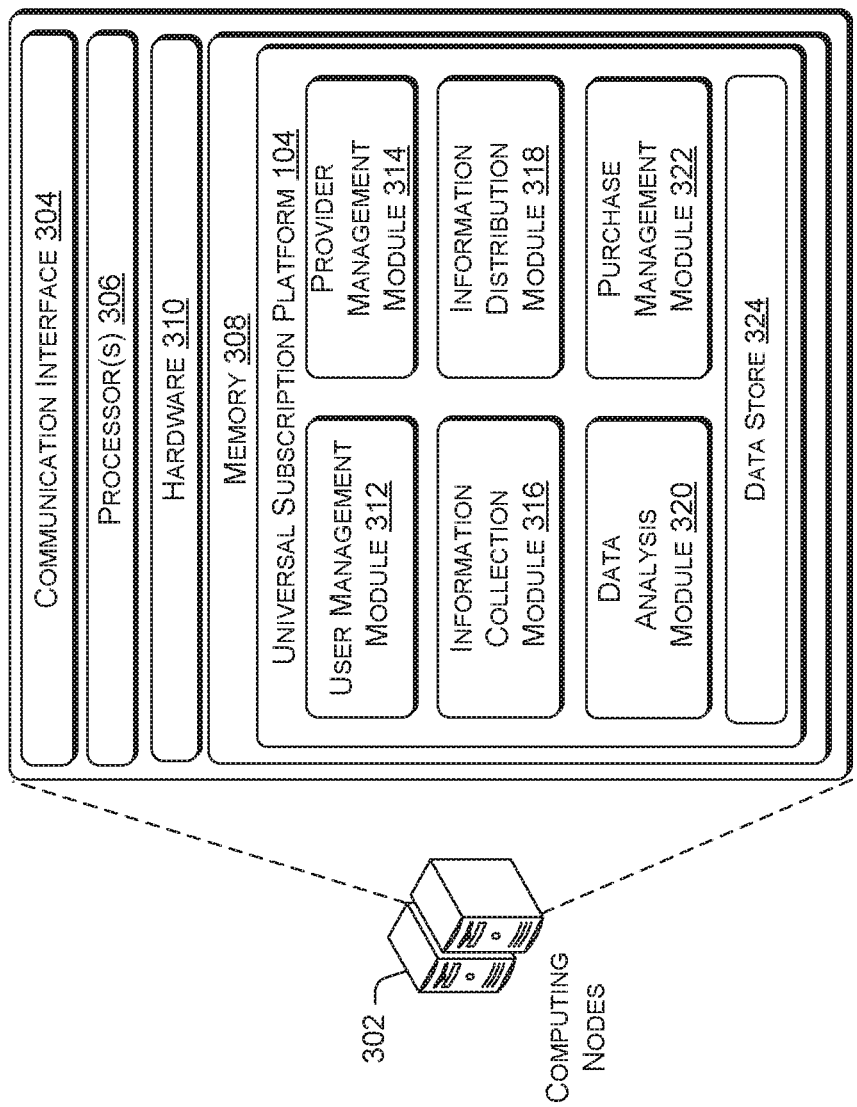
FIG. 3 is a block diagram showing various components of one or more illustrative computing nodes that enable a universal subscription platform to provide the common ordering interface portal.

FIG. 3 is a block diagram showing various components of one or more illustrative computing nodes that enable a universal subscription platform to provide the common ordering interface portal. The universal subscription platform 104 may be implemented by the computing nodes 302. The computing nodes 302 may include a communication interface 304, one or more processors 306, and memory 308. The communication interface 304 may include wireless and/or wired communication components that enable the one or more computing nodes 302 to transmit data to and receive data from other networked devices. The computing nodes 302 may be accessed via hardware 310. The hardware 310 may include additional user interface, data communication, or data storage hardware. For example, the user interface may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The universal subscription platform 104 may be stored in the memory 308 and executed by the one or more processors 306. The universal subscription platform 104 may include a user management module 312, a provider management module 314, an information collection module 316, an information distribution module 318, a data analysis module 320, and a purchase management module 322. The modules may include routines, program instructions, objects, and/or data structures that perform particular tasks or implement particular abstract data types.

The user management module 312 may enable users, such as the user 108, to create customer accounts. For example, a user may establish a corresponding customer account by providing registration information to the user management module 312 via a user device, such as the user device 106. The registration information may include a customer name, a customer address, customer contact information, a login identifier, a password, and/or so forth. In some instances, the login identifier may be a subscriber access identifier that is used by the wireless carrier network 102 to authenticate the user on behalf of the universal subscription platform 104. The registration information may also include the device identifiers of user devices that a user uses to consume program and/or advertising content segments. The user management module 312 may store such information of each user in a corresponding user profile that is kept in the data store 324.

The provider management module 314 may be responsible for managing providers who offer services or content through the universal subscription platform 104. The providers may include the third-party service providers 116(1)-116(M) and the third-party content providers 120-120(J). Accordingly, a provider may interface with the provider management module 314 to create a provider account. For example, the provider may establish a corresponding provider account by sending registration information to the provider management module 314 via a user device. The registration information may include a provider name, a business name, a business address, business contact information, a login name, a password, and/or so forth. In this way, a provider account may enable the provider to set up a server of the provider to automatically send service information or content information to the information collection module 316. Alternatively, the provider account may enable an administrator of the provider to log into an online portal provided by the information collection module 316 to input service information or content information.

The information collection module 316 may retrieve information from various data sources. The data sources may include the data sources of the third-party service providers 116(1)-116(M) that provide service information 114(1)-114(K), as well as the data sources of the third-party content providers 120-120(J) that provide content information 118(1)-118(H). In various embodiments, the information collection module 316 may use data adaptors to retrieve data from the databases of the data sources. For example, the information collection module 316 may use data-agnostic data adaptors to access unstructured databases, and/or database-specific data adaptors to access structured databases. In some embodiments, the information collection module 316 may use a workflow scheduler to periodically check for and retrieve newly available data from the multiple data sources. The operations of the workflow scheduler may be dictated by configurable policies. For example, a configurable policy may specify the source data location, frequency of data retrieval, handling procedures for late arrival data, data retention period, and data disposal following an expiration of the data retention period. In some instances, adaptor-specific logic may be implemented to decode and/or convert the format of the data received from the various data sources for further processing. In alternative embodiments, the information collection module 316 may provide an online portal that enables an administrator of a service provider to manually input the service information or a content provider to manually input the content information. The information collection module 316 may store the received information in the data store 324.

The information distribution module 318 may customize the distribution of information for one or more services and/or one or more media content files to each user device based on one or more user characteristics of a corresponding user. 320 may track such data based on the requests received by the purchase management module 322. The information distribution module 318 may perform such analysis for users that have consented to such collection. For example, the data analysis module 320 may present a consent interface to a user via the common ordering interface portal 112. The consent interface may enable the user to grant permission for the universal subscription platform 104 to customize offers based on the user characteristics of the user by providing an affirmative input, such as clicking on a checkbox, tapping a consent button, moving a virtual switch from an off position to an on position, and/or so forth. These user characteristics may include a type of the network subscription plan that the user has with the wireless carrier network 102, a prior subscription history of the user, a prior content download or purchase history of the user, a prior service and/or content browser history of the user, demographic parameters of the user, and/or so forth. In various embodiments, the information distribution module 318 may use a machine learning algorithm, a term matching algorithm, a pattern matching algorithm, a statistical analysis algorithm, and/or other algorithms to compare the user characteristics to descriptors in the service information of services and the content information of media content files. The descriptors may include keywords, key phrases, catalog information, metadata tag information, user reviews and comments, and/or so forth.

In some embodiments, the information distribution module 318 may select one or more offers for the user device based on the user characteristics of the corresponding user in a similar manner. In some instances, an offer may include a special discount on a subscription to a service or a purchase of one or more media content files. In other instances, an offer may provide a period of free subscription to a service with or without a purchased subscription period to the service. In additional instances, an offer may provide one or more free media content files with or without purchasing one or more other media content files. In further instances, an offer may include a bundle of one or more services and/or one or more media content files that are curated by another user. In some instances, each offer may be annotated with descriptors that can be compared to the user characteristics of a user via an algorithm of the information distribution module 318.

In other embodiments, the information distribution module 318 may use a data analysis module 320 to select one or more offers for the user device. In such embodiments, the data analysis module 320 may collect service subscription data and content retrieval data of users as the users subscribe to services and retrieve media content files. In at least one embodiment, the data analysis module 320 may track such data based on the requests received by the purchase management module 322. The data analysis module 320 may perform such collection for users that have consented to such collection. For example, the data analysis module 320 may present a consent interface to a user via the common ordering interface portal. The consent interface may enable the user to grant permission to the collection of the data. The data analysis module 320 may correlate the collected information with demographic information of the users to generate correlated information. The correlated information is then stored by the data analysis module 320 in the data store 324. Subsequently, the information distribution module 318 may provide one or more offers to a user based on a corresponding subset of information of the correlated information. For example, a subset of information for a user may indicate that the user likes a particular genre of television shows. Accordingly, the information distribution module 318 may use the subset of information to offer media content files of other television shows in the same genre at a discount to the user.

Following the selection of the information for one or more services and/or one or more media content files for a user device, the information distribution module 318 may send the information for distribution to the user device via the common ordering interface portal 112. In some embodiments, the information distribution module 318 may use a web server to generate the one or more web pages of the common ordering interface portal 112. In other embodiments, the information distribution module 318 may send the information to the user device 106 for the device to construct the common ordering interface portal 112. For example, the information distribution module 318 may use different protocols to transmit the information for presentation by a web browser or a client application. The protocols may include the common gateway interface (CGI) protocol, the active server pages (ASP) protocol, asynchronous JavaScript and XML (AJAX), hypertext transfer protocol secure (HTTPS) protocol, and/or the like.

The purchase management module 322 may receive a subscription request, such as the subscription request 130 that is initiated via a common ordering interface portal. In turn, the purchase management module 322 may forward the subscription request to a POS function of a corresponding service provider. In some instances, the purchase management module 322 may consult a subscription agreement database of the wireless carrier network 102 to determine if the wireless carrier network 102 is covering the cost of the subscription to the service. If the wireless carrier network 102 is covering the cost, the purchase management module 322 may append a metadata tag to the subscription request prior to sending the request to the POS function.

In other embodiments, the purchase management module 322 may further receive a calculated subscription cost from the POS function and present the cost with a request for user consent on the common ordering interface portal. In turn, the purchase management module 322 may send an inputted user consent to the POS function. Following a subscription acknowledgment from the POS function, the purchase management module 322 may direct the common ordering interface portal to present information included in the subscription acknowledgment. Further, the purchase management module 322 may forward the subscription request to a billing function of the wireless carrier network 102 if the cost is not covered by the wireless carrier network 102.

Likewise, the purchase management module 322 may receive a retrieval request, such as the retrieval request 132 that is initiated via the common ordering interface portal. In some instances, the purchase management module 322 may consult a subscription agreement database of the wireless carrier network 102 to determine if the wireless carrier network 102 is covering the cost of the media content file retrieval. If the wireless carrier network 102 is covering the cost, the purchase management module 322 may append a metadata tag to the retrieval request prior to sending the request to the POS function. In other embodiments, the purchase management module 322 may further receive a calculated consumption cost from the POS function and present the cost with a request for user consent on the common ordering interface portal. In turn, the purchase management module 322 may send an inputted user consent to the POS function. Following a retrieval acknowledgment from the POS function, the purchase management module 322 may direct the common ordering interface portal to present information included in the retrieval acknowledgment. Further, the purchase management module 322 may forward the retrieval request to a billing function of the wireless carrier network 102 if the cost is not covered by the wireless carrier network 102.

Figure 4:
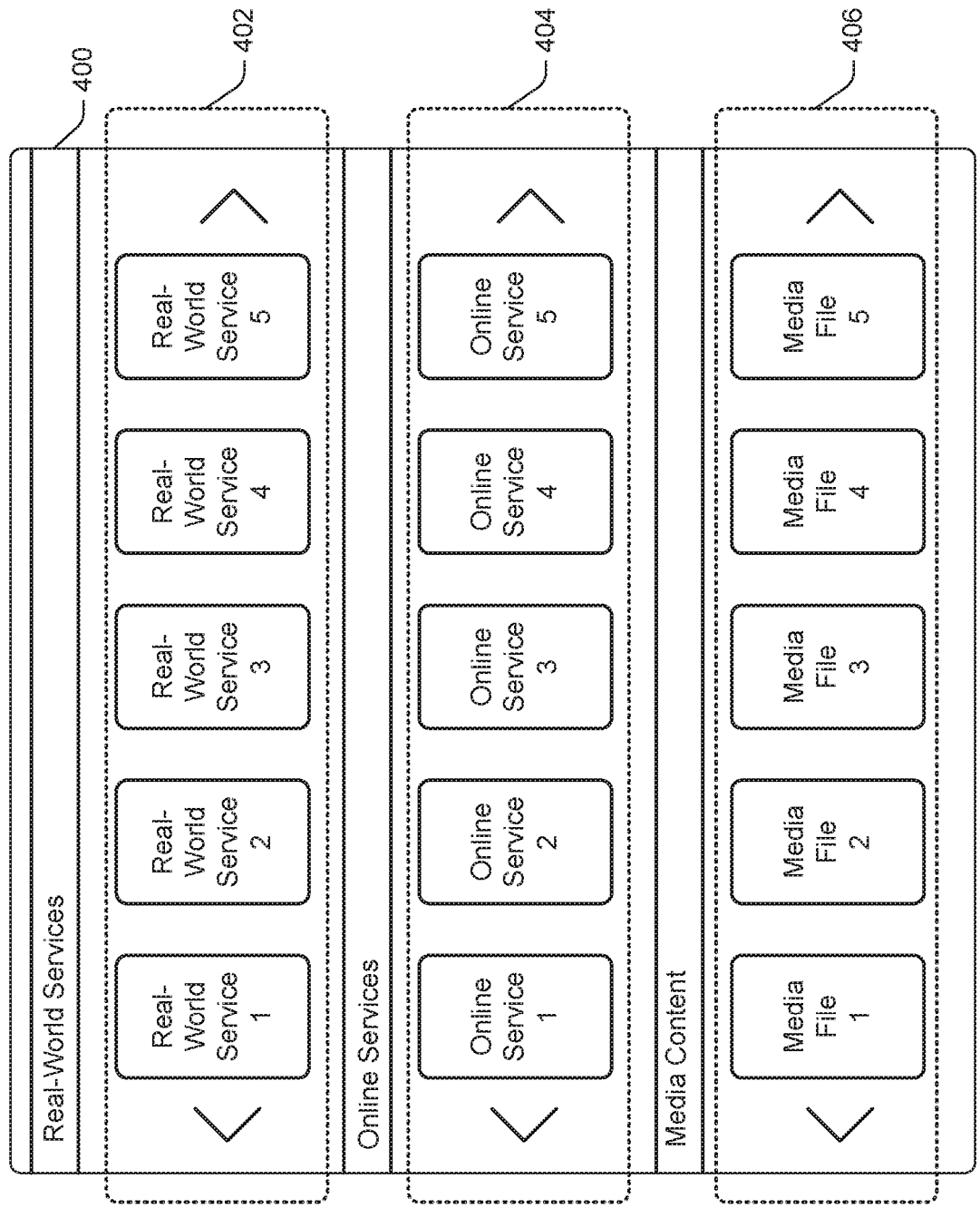
FIG. 4 shows an example service and content selection interface displayed on a common ordering interface portal.

FIG. 4 shows an example service and content selection interface 400 displayed on a common ordering interface portal. The service and content selection interface 400 may display a first set of scrollable icons 402 that represent real-world services, a second set of scrollable icons 404 that represent online services, and a third set of scrollable icons 406 that represent media content files. Each of the icons may be selected to access additional information regarding a corresponding service or media content file as well as user interface controls that enable a user to subscribe to a service or retrieve a media content file. In various embodiments, the number of sets of scrollable icons as well as the icons in each set that are presented via the service and content selection interface may be customized by the universal subscription platform 104 based on the type of subscription plan that the user has with the wireless carrier network 102 and/or the user characteristics of the user. Accordingly, the example service and content selection interface 400 is illustrative rather than limiting.

Figure 5:
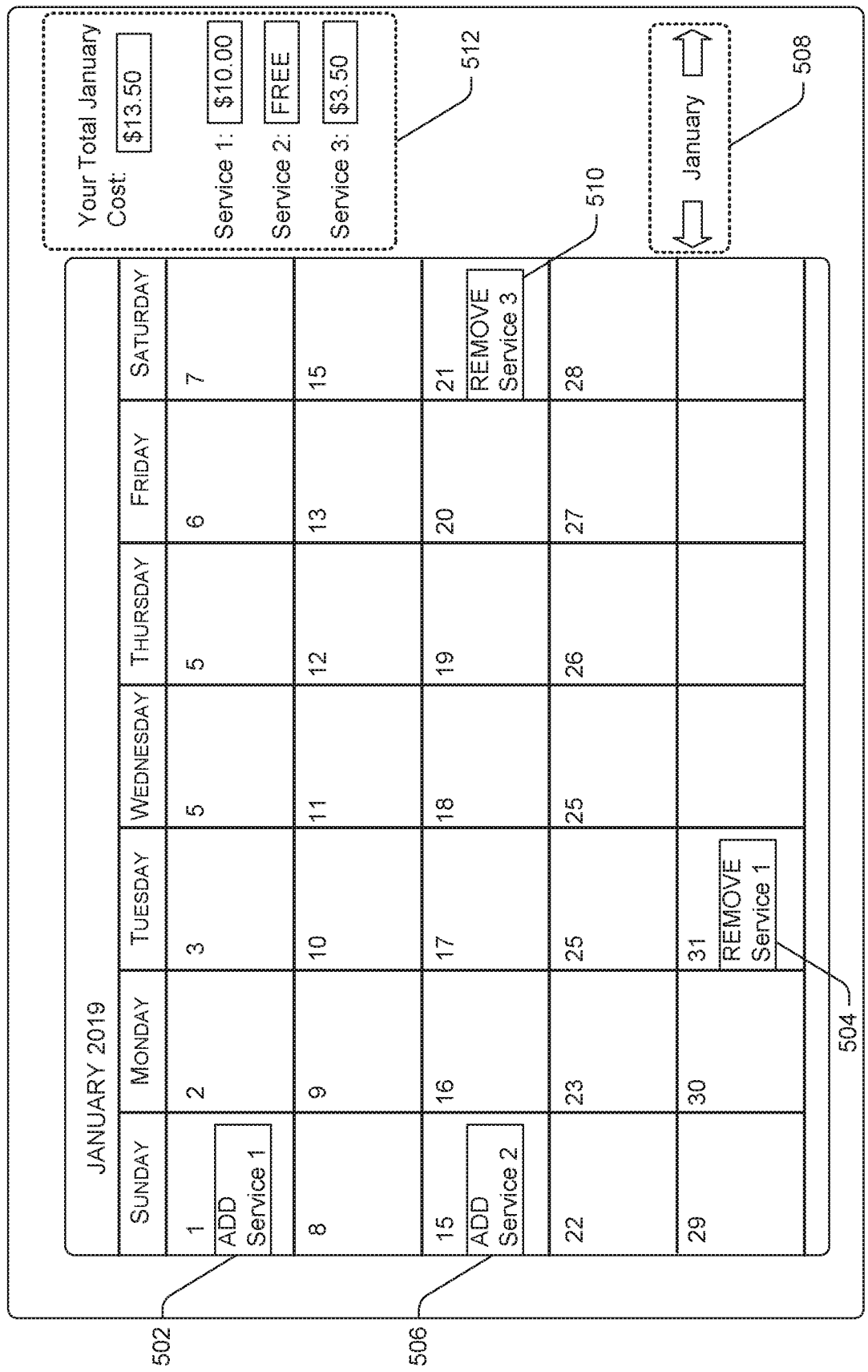
FIG. 5 shows an example subscription configuration interface displayed on a common ordering interface portal.

FIG. 5 shows an example subscription configuration interface 500 displayed on a common ordering interface portal. The example subscription configuration interface 500 may be used by a user to designate the start date and the end date for each service subscription. For example, the user may place a marker 502 to indicate that the user desires to initiate a subscription to a first service on an initiation date and place a marker 504 to indicate that the user desires to end the subscription to the first service on a termination date. Further, the user may place a marker 506 that initiates a subscription to a second service on a particular date of the current month, and then use the scroll control 508 to scroll to a different following month to place another marker that terminates the subscription to the second service. Likewise, the user may place a marker 510 that terminates a subscription to a third service that the user initially subscribed to in a different month the precedes the current month.

In some embodiments, the subscription configuration interface 500 may present a cost window 512 that summarizes the total monthly cost of the various services that are subscribed to by the user. In this way, the user may make an informed decision as to the number of services to which the user desires to subscribe. It will be appreciated that there are other subscription interfaces, such as dropdown menus, data entry boxes, etc. that may be used by a user to set start dates and end dates for subscription services in other embodiments. Accordingly, the example subscription configuration interface 500 is illustrative rather than limiting.

Example Processes

FIGS. 6-10 present illustrative processes 600-1000 for a user to manage subscriptions to multiple third-party real-world and online services using a common ordering interface portal. Each of the processes 400-800 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-800 are described with reference to the architecture 100 of FIG. 1.

Figure 6:
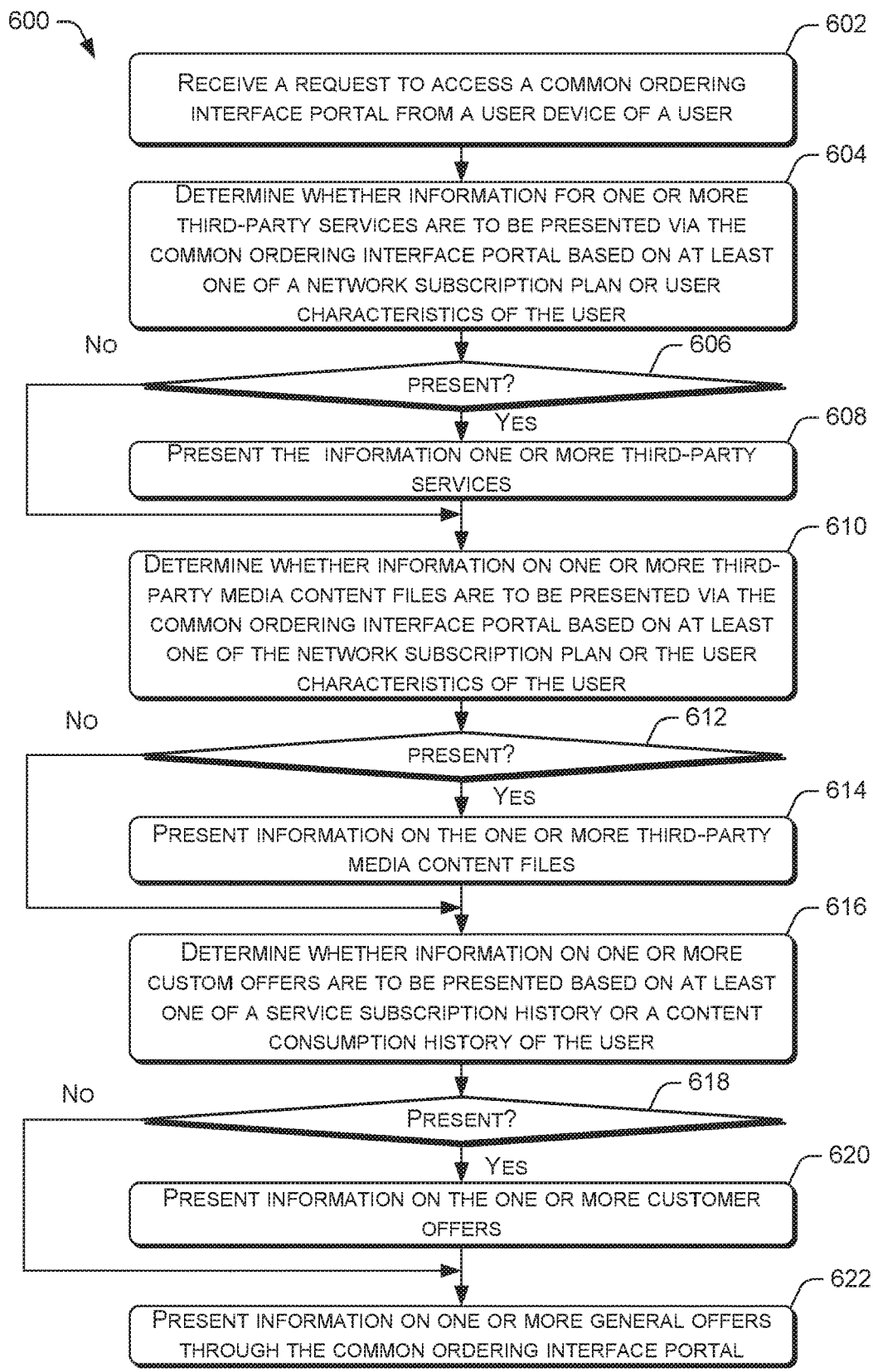
FIG. 6 is a flow diagram of an example process for a user to subscribe to one or more third-party services via the common ordering interface portal provided by the universal subscription platform.

FIG. 6 is a flow diagram of an example process 600 for a user to subscribe to one or more third-party services via the common ordering interface portal provided by the universal subscription platform. At block 602, the universal subscription platform 104 may receive a request to access the common ordering interface portal 112 from the user device 106 of the user 108. At block 604, the universal subscription platform 104 may determine whether information on one or more third-party services is to be presented via the common ordering interface portal 112 based on at least one of a network subscription plan or user characteristics of the user 108. For example, a user with a postpaid subscription plan to the telecommunication services of the wireless carrier network may be provided with more available third-party service options than a user with a prepaid subscription. In another example, the universal subscription platform 104 may provide different third-party service options based on the demographic information of the user (e.g., age, gender, etc.).

At decision block 606, if the universal subscription platform 104 determines that information to which the one or more third-party services is to be presented ("yes" at decision block 606), the process 600 may proceed to block 608. At block 608, the universal subscription platform 104 may present information on the one or more third-party services via the common ordering interface portal 112. Subsequently, the process 600 may proceed to block 610. However, if the universal subscription platform determines that no information is to be presented ("no" at decision block 606), the process 600 may proceed to directly to block 610.

At block 610, the universal subscription platform 104 may determine whether information on one or more third-party media content files are to be presented via the common ordering interface portal based on at least one of the network subscription plan or the user characteristics of the user. For example, a user with a postpaid subscription plan to the telecommunication services of the wireless carrier network may be provided with more available third-party content options than a user with a prepaid subscription. In another example, the universal subscription platform 104 may provide different third-party content options based on the demographic information of the user (e.g., age, gender, etc.).

At decision block 612, if the universal subscription platform 104 determined that information on the one or more third-party media content files is to be presented ("yes" at decision block 612), the process 600 may proceed to block 614. At block 614, the universal subscription platform 104 may present the information on the one or more third-party media content files. Subsequently, the process 600 may proceed to block 616. However, if the universal subscription platform determines that no information is to be presented ("no" at decision block 612), the process 600 may proceed directly to block 616.

At block 616, the universal subscription platform 104 may determine whether information on one or more custom offers is to be presented based on at least one of a service subscription history or a content consumption history of the user. In various embodiments, each custom offer may offer an incentive (e.g., a discount) to the user for subscribing to a third-party service or consuming a third-party media content file.

At decision block 618, if the universal subscription platform 104 determines that one or more custom offers are to be presented ("yes" at decision block 618), the process 600 may proceed to block 620. At block 620, the universal subscription platform 104 may present the information on the one or more custom offers via the common ordering interface portal 112. At block 622, the universal subscription platform 104 may present information on the one or more general offers through the common ordering interface portal 112. In various embodiments, a general offer may be an offer that is specifically targeted toward the user based on one or more user characteristics of the user, but one which is made available to multiple users in a geographical area for a predetermined amount of time. However, if the universal subscription platform 104 determines that the information on the one or more custom offers are not to be presented ("no" at decision block 618), the process 600 may proceed directly to block 622.

Figure 7:
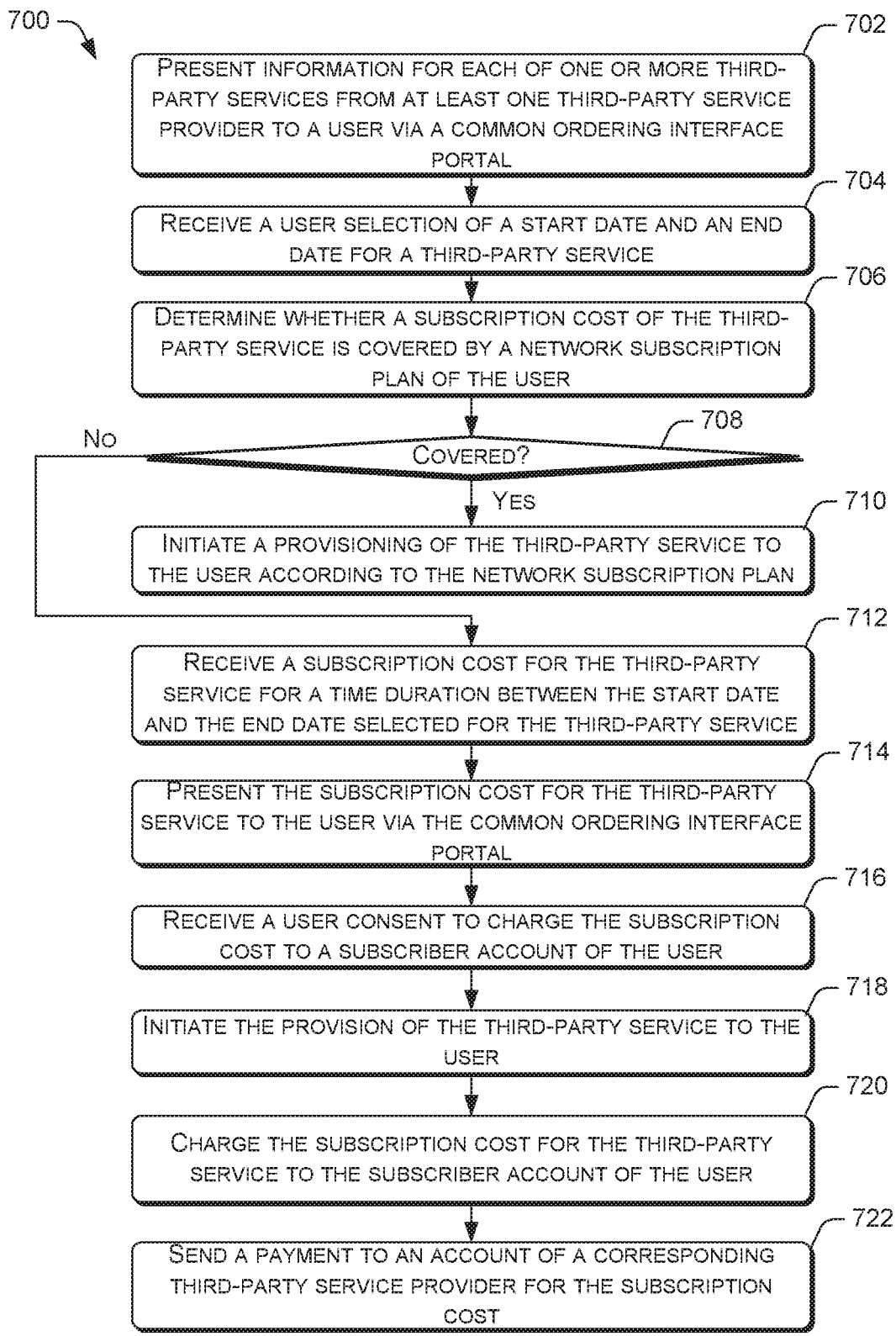
FIG. 7 is a flow diagram of an example process for charging a subscriber account of a user for one or more third-party services that are subscribed to by the user via the common ordering interface portal of the universal subscription platform.

FIG. 7 is a flow diagram of an example process 700 for charging a subscriber account of a user for one or more third-party services that are subscribed to by the user via the common ordering interface portal of the universal subscription platform. At block 702, the universal subscription platform 104 may present information for each of one or more third-party services from at least one third-party service provider to a user via a common ordering interface portal. At block 704, the universal subscription platform 104 may receive a user selection of a start date and an end date for a third-party service. At block 706, the universal subscription platform 104 may determine whether a subscription cost of the third-party service is covered by a network subscription plan of the user. For example, the subscription cost may be covered by the benefits associated with a network subscription plan of the user with the wireless carrier network 102. At decision block 708, if the universal subscription platform 104 determines that the subscription cost is covered ("yes" at decision block 708), the process 700 may proceed to block 710. At block 710, the universal subscription platform 104 may initiate a provisioning of the third-party service to the user according to the network subscription plan. For example, the universal subscription platform 104 may receive information from the third-party service provider that includes instructions for obtaining the third-party service and present such information to the user via the common ordering interface portal.

However, if the universal subscription platform 104 determines that the subscription cost is not covered ("no" at decision block 708), the process 700 may proceed to block 712. At block 712, the universal subscription platform 104 may receive a subscription cost for the third-party service for a time duration between the start date and the end date selected for the third-party service from a corresponding service provider. In various embodiments, the subscription cost may be calculated by a POS function of the corresponding service provider. At block 714, the universal subscription platform 104 may present the subscription cost for the third-party service to the user via the common ordering interface portal.

At block 716, the universal subscription platform 104 may receive a user consent to charge the subscription cost to a subscriber account of the user. In various embodiments, the user may input the user consent via a user interface menu presented by the common ordering interface portal. At block 718, the universal subscription platform 104 may initiate the provisioning of the third-party service to the user. At block 720, the universal subscription platform 104 may charge the subscription cost for the third-party service to the subscriber account of the user. The subscriber account may be an account that the user established with the wireless carrier network 102. In alternative embodiments, the subscriber account being charged may be an account established by an additional user, e.g., a primary account holder, with the wireless carrier network 102 for which the user is an authorized user. At block 722, the universal subscription platform 104 may send a payment to an account of a corresponding third-party service provider for the subscription cost.

Figure 8:
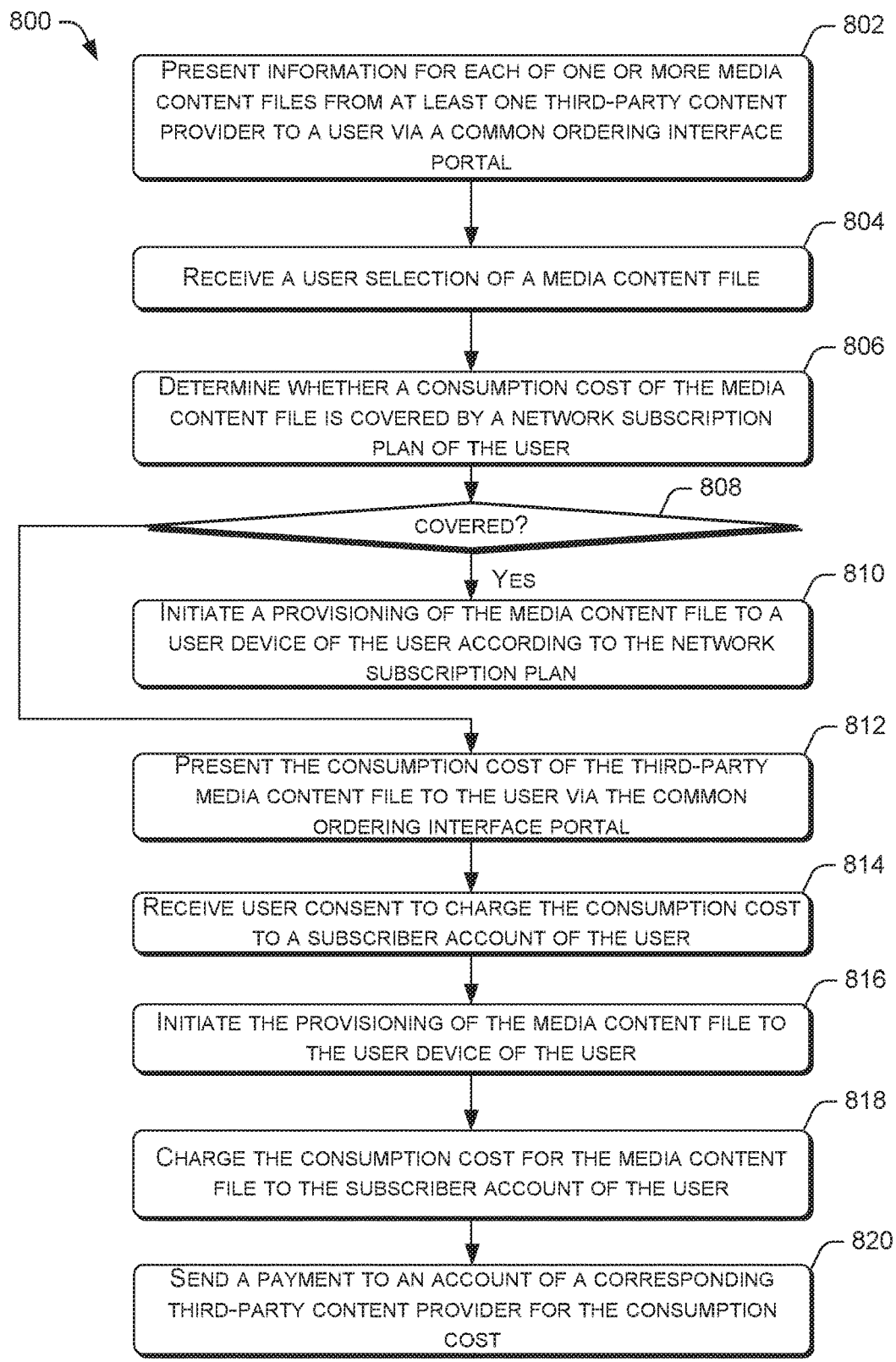
FIG. 8 is a flow diagram of an example process for charging a subscriber account of a user for one or more third-party content files of third-party content providers that are downloaded by the user via the common ordering interface portal of the universal subscription platform.

FIG. 8 is a flow diagram of an example process 800 for charging a subscriber account of a user for one or more third-party content files of third-party content providers that are downloaded by the user via the common ordering interface portal of the universal subscription platform. At block 802, the universal subscription platform 104 may present information for each of one or more media content files from at least one third-party content provider to a user via a common ordering interface portal. At block 804, the universal subscription platform 104 may receive a user selection of a media content file. In various embodiments, the user may input the user selection via a user interface menu presented by the common ordering interface portal. At block 806, the universal subscription platform 104 may determine whether a consumption cost of media content file is covered by a network subscription plan of the user. For example, the consumption cost may be covered by the benefits associated with a network subscription plan of the user with the wireless carrier network 102.

At decision block 808, if the universal subscription platform 104 determines that the consumption cost is covered ("yes" at decision block 808), the process 800 may proceed to block 810. At block 810, the universal subscription platform 104 may initiate a provisioning of the media content file to a user device of the user according to the network subscription plan. In various embodiments, the initiation may include the universal subscription platform 104 receiving information from the third-party content provider, in which the information may include terms and conditions for the retrieval or consumption of the media content file, instructions for obtaining access to the media content file, a link to the media content profile, and/or so forth. The information is then presented by the universal subscription platform 104 to the user via the common ordering interface portal.

However, if the universal subscription platform 104 determines that the consumption cost is not covered ("no" at decision block 808), the process 800 may proceed to block 812. At block 812, the universal subscription platform 104 may present the consumption cost of the third-party media content file to the user via the common ordering interface portal. In various embodiments, the consumption cost may be calculated by a POS function of the corresponding content provider.

At block 814, the universal subscription platform 104 may receive user consent to charge the consumption cost to a subscriber account of the user. In various embodiments, the user may input the user consent via a user interface menu presented by the common ordering interface portal. At block 816, the universal subscription platform 104 may initiate the provisioning of the media content file to the user device of the user. At block 818, the universal subscription platform 104 may charge the consumption cost for the media content file to the subscriber account of the user. In alternative embodiments, the subscriber account being charged may be an account established by an additional user, e.g., a primary account holder, with the wireless carrier network 102 for which the user is an authorized user. At block 820, the universal subscription platform 104 may send a payment to an account of a corresponding third-party content provider for the consumption cost.

Figure 9:
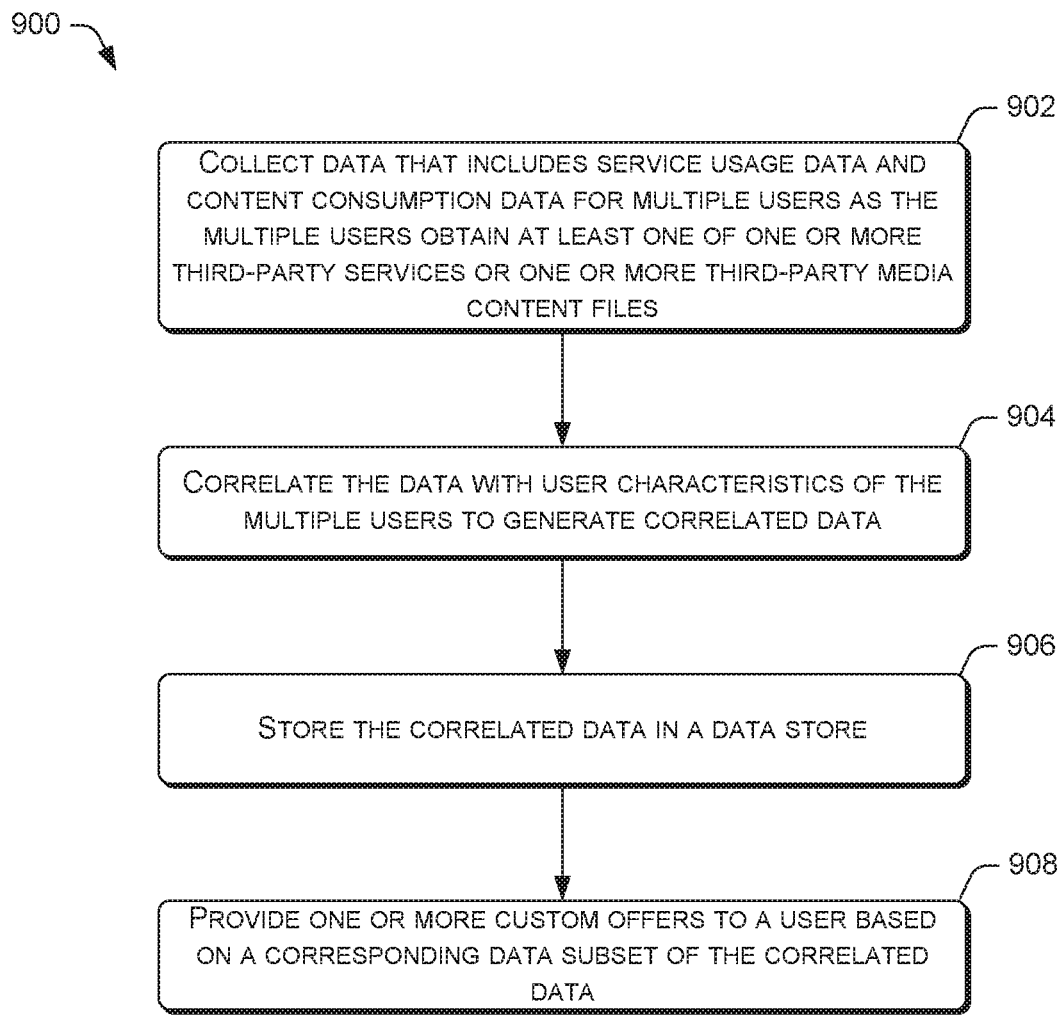
FIG. 9 is a flow diagram of an example process for collecting and analyzing service usage data and content consumption data of a subscriber to enable the common ordering interface portal of the universal subscription platform to provide one or more offers to the sub scriber.

FIG. 9 is a flow diagram of an example process 900 for collecting and analyzing service usage data and content consumption data of a subscriber to enable the common ordering interface portal of the universal subscription platform to provide one or more offers to the subscriber. The example process 900 further describes block 616 of the example process 600. At block 902, the universal subscription platform 104 may collect data that includes service usage data and content consumption data for multiple users as the users obtain at least one of one or more third-party services or one or more third-party media content files. At block 904, the universal subscription platform 104 may correlate the data with user characteristics of the multiple users to generate correlated data. At block 906, the universal subscription platform 104 may store the correlated data in a data store. At block 908, the universal subscription platform 104 may provide one or more custom offers to a user based on a corresponding data subset of the correlated data. In various embodiments, the universal subscription platform 104 may use the common ordering interface portal to present the one or more custom offers.

Figure 10:
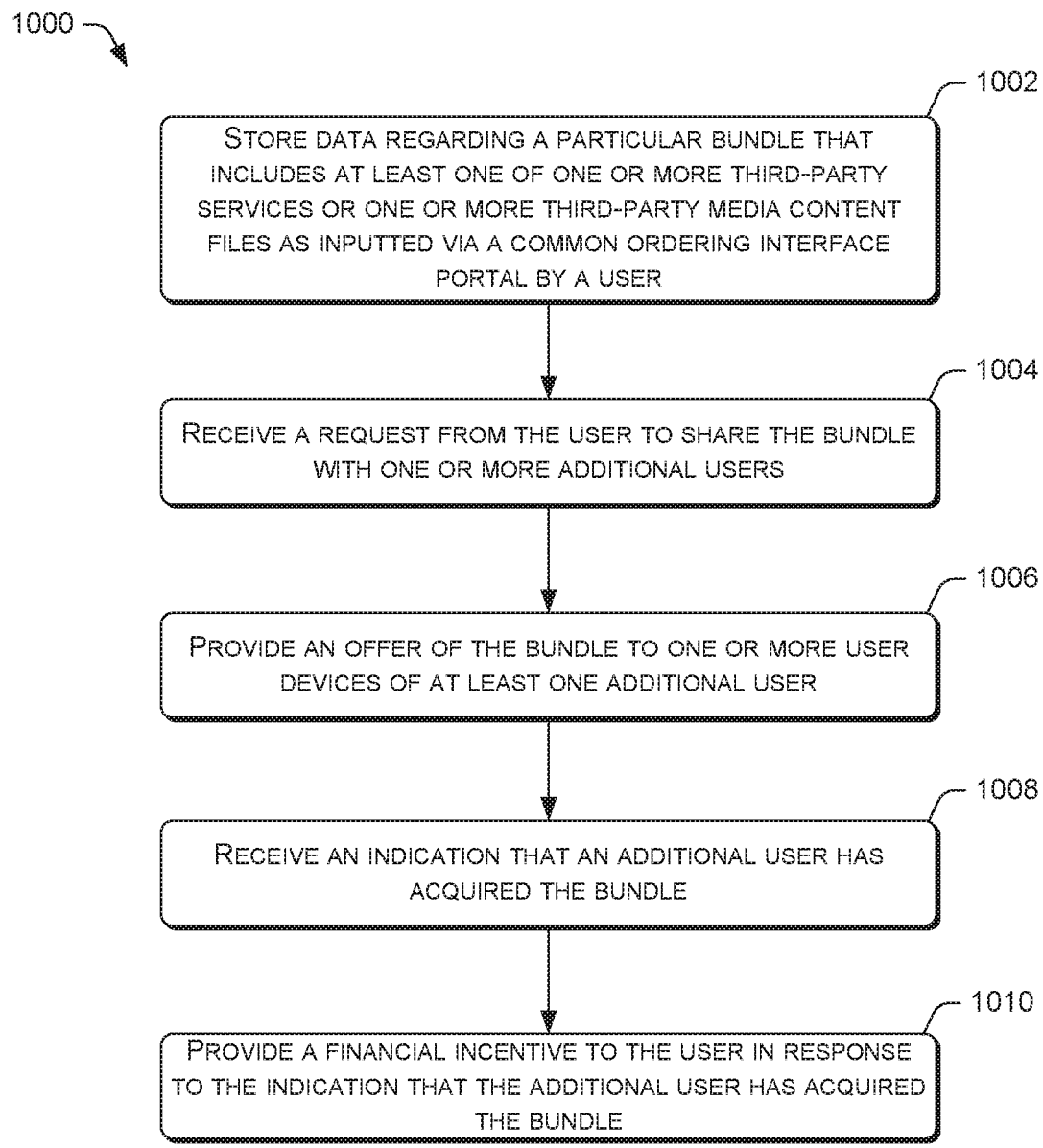
FIG. 10 is a flow diagram of an example process for collecting and analyzing service usage data and content consumption data of a subscriber to enable the common ordering interface portal of the universal subscription platform to provide one or more offers to the sub scriber.

FIG. 10 is a flow diagram of an example process 1000 for collecting and analyzing service usage data and content consumption data of a subscriber to enable the common ordering interface portal of the universal subscription platform to provide one or more offers to the subscriber. At block 1002, the universal subscription platform 104 may store data regarding a particular bundle that includes at least one of one or more third-party services or one or more third-party media content files as inputted via a common ordering interface portal by a user. At block 1004, the universal subscription platform 104 may receive a request from the user to share the bundle with one or more additional users. In various embodiments, the user may input the request via a user interface menu presented by the common ordering interface portal.

At block 1006, the universal subscription platform 104 may provide an offer of the bundle to one or more user devices of at least one additional user. For example, the offer may be presented by the universal subscription platform 104 via the common ordering interface portal. At block 1008, the universal subscription platform 104 may receive an indication that an additional user has acquired the bundle. For example, the acquisition may include the additional user subscribing to the third-party services and/or consuming the third-party media content files included in the bundle. At block 1010, the universal subscription platform 104 may provide a financial incentive to the user in response to the indication that the additional user has acquired the bundle. For example, the purchase management module 322 of the universal subscription platform 104 may send a payment to a subscriber account of the user that the user established with the wireless carrier network 102 following the purchase.

The universal subscription platform may provide a user with several advantages. For example, the platform offers a one-stop shop for the user to manage the subscription-based services of the user, in which the services may include both real-world services and online services. In various embodiments, the universal subscription platform may offer the user the ability to pay for multiple subscription services using a payment arrangement that is pre-established with the wireless carrier network. In other words, a mobile network operator (MNO) of the wireless carrier network may be responsible for obtaining payment for a third-party service or content from the user and then sending the payment to the third-party provider of the service or the content. In this way, the user may enjoy the convenience of paying a single entity rather than making multiple payment arrangements with multiple entities.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:

determining, via a subscription platform of a wireless carrier network, that information for one or more third-party services are to be presented via a common ordering interface portal; and generating, for presentation via the common ordering interface portal, a calendar interface that is configured to display a month of a year and that is configured to:

allow a user to place (i) a first marker on a first selected day of the month that indicates to subscribe to a third-party service of the one or more third-party services and (ii) a second marker on a second selected day of the month or another month that indicates to unsubscribe from the third-party service;

present a subscription cost of the third-party service that is based on the first marker being placed on the first selected day and based on the second marker being placed on the second selected day;

allow a user to place (i) a third marker on a third selected day of the month that indicates to subscribe to an additional third-party service of the one or more third-party services and (ii) a fourth marker on a fourth selected day of the month or the other month that indicates to unsubscribe from the additional third-party service;

present an additional subscription cost of the additional third-party service that is based on the third marker being placed on the third selected day and based on the fourth marker being placed on the fourth selected day; and in response to selection of a month of the calendar interface, display at least the subscription cost of the third-party service, the additional subscription cost of the additional third-party service, and a corresponding cumulative subscription cost based at least on the subscription cost of the third-party service and the additional subscription cost of the additional third-party service.

2. The one or more non-transitory computer-readable media of claim 1, wherein the one or more third party services comprise a delivery service, an online media access service, or an online interactive service.

3. The one or more non-transitory computer-readable media of claim 1, wherein the acts further comprise:
collecting data that includes service usage data and content consumption data for multiple users as the multiple users obtain at least one of the one or more third-party services;
correlating the data with user characteristics of the multiple users to generate correlated data; and
providing one or more custom offers to the user based on a corresponding data subset of the correlated data.

4. The one or more non-transitory computer-readable media of claim 1, wherein the acts further comprise:
storing data regarding a particular bundle curated by the user that includes at least one third-party service inputted via the common ordering interface portal by the user;
receiving a request from the user to share the particular bundle with one or more additional users;
providing an offer of the particular bundle to one or more user devices of at least one additional user;
receiving an indication that an additional user has acquired the particular bundle by at least subscribing to the at least one third-party service in the particular bundle; and
providing a financial incentive to the user in response to the indication that the additional user has acquired the particular bundle by at least subscribing to the at least one third-party service in the particular bundle.

5. The one or more non-transitory computer-readable media of claim 1, wherein the subscription cost of the third-party service is a cost for the month displayed on the calendar interface without including costs for other months.

6. The one or more non-transitory computer-readable media of claim 1, wherein the calendar interface is configured to:
allow the user to place a third marker on a third selected day of the month that indicates to subscribe to an additional third-party service of the one or more third-party services;
provide a selectable navigation button that, upon selection by the user, navigates the calendar interface to an additional month;
in response to receiving a selection of the selectable navigation button, presenting the additional month in the calendar interface;
allow the user to place a fourth marker on a fourth selected day of the additional month that indicates to unsubscribe to the additional third-party service; and
present an additional subscription cost of the additional third-party service based on the third marker being placed on the third selected day of the month and based on the fourth marker being placed on the fourth selected day of the additional month.

7. The one or more non-transitory computer-readable media of claim 1, wherein the subscription cost is free.

8. The one or more non-transitory computer-readable media of claim 1, wherein the calendar interface is configured to:
allow the user to move the first marker to a third selected day of the month; and
present an updated subscription cost of the third-party service that is based on the first marker being moved to the third selected day and based on the second marker being placed on the second selected day.

9. The one or more non-transitory computer-readable media of claim 1, wherein the acts further comprise:
receiving a selection of a third-party media content file via the common ordering interface portal;
determining whether a consumption fee of the third-party media content file is covered by a network subscription plan of the user; and
in response to determining that the consumption fee of the third-party media content file is covered, initiating a provisioning of the third-party media content file to the user via the common ordering interface portal.

10. The one or more non-transitory computer-readable media of claim 9, wherein the acts further comprise, in response to determining that the consumption fee of the third-party media content file is not covered:
receiving an input of a user consent to the consumption fee via the common ordering interface portal following a presentation of the consumption fee on the common ordering interface portal;
charging the consumption fee for the third-party media content file to a subscriber account that the user uses with a wireless carrier; and
initiating the provisioning of the third-party media content file to the user via the common ordering interface portal.

11. The one or more non-transitory computer-readable media of claim 10, wherein the acts further comprise sending a payment to an account of a third-party content provider that provided the third-party media content file.

12. The one or more non-transitory computer-readable media of claim 11, wherein the subscriber account is controlled by a primary account holder, and the user is authorized by the primary account holder to use the subscriber account.

13. The one or more non-transitory computer-readable media of claim 1, wherein the acts further comprise:
determining whether the subscription cost of the third-party service between the first selected day and the second selected day is covered by a network subscription plan of the user; and
in response to determining that the subscription cost of the third-party service is covered, initiating a provisioning of the third-party service to the user via the common ordering interface portal according to the first selected day and the second selected day.

14. The one or more non-transitory computer-readable media of claim 13, wherein the acts further comprise, in response to determining that the subscription cost of the third-party service is not covered:
receiving an input of a user consent to the subscription cost via the common ordering interface portal following the presentation of the subscription cost on the common ordering interface portal;

charging the subscription cost for the third-party service to a subscriber account that the user uses with the wireless carrier network; and initiating the provisioning of the third-party service to the user via the common ordering interface portal according to the first selected day and the second selected day via the common ordering interface portal.

15. The one or more non-transitory computer-readable media of claim 14, wherein the acts further comprise sending a payment to an account of a corresponding third-party service provider that provided the third-party service.

16. The one or more non-transitory computer-readable media of claim 14, wherein the subscriber account is controlled by a primary account holder, and the user is authorized by the primary account holder to use the subscriber account.

17. A computer-implemented method, comprising:

determining, via a subscription platform of a wireless carrier network, that information for one or more third-party services are to be presented via a common ordering interface portal; and generating, for presentation via the common ordering interface portal, a calendar interface that is configured to display a month of a year and that is configured to:

allow a user to place (i) a first marker on a first selected day of the month that indicates to subscribe to a third-party service of the one or more third-party services and (ii) a second marker on a second selected day of the month or another month that indicates to unsubscribe from the third-party service;

present a subscription cost of the third-party service that is based on the first marker being placed on the first selected day and based on the second marker being placed on the second selected day;

allow a user to place (i) a third marker on a third selected day of the month that indicates to subscribe to an additional third-party service of the one or more third-party services and (ii) a fourth marker on a fourth selected day of the month or the other month that indicates to unsubscribe from the additional third-party service;

present an additional subscription cost of the additional third-party service that is based on the third marker being placed on the third selected day and based on the fourth marker being placed on the fourth selected day; and in response to selection of a month of the calendar interface, display at least the subscription cost of the third-party service, the additional subscription cost of the additional third-party service, and a corresponding cumulative subscription cost based at least on the subscription cost of the third-party service and the additional subscription cost of the additional third-party service.

18. A system, comprising:

one or more processors; and memory including a plurality of computer-executable components that are executable by the one or more processors to perform a plurality of actions, the plurality of actions comprising:

determining, via a subscription platform of a wireless carrier network, that information for one or more third-party services are to be presented via a common ordering interface portal; and generating, for presentation via the common ordering interface portal, a calendar interface that is configured to display a month of a year and that is configured to:

allow a user to place (i) a first marker on a first selected day of the month that indicates to subscribe to a third-party service of the one or more third-party services and (ii) a second marker on a second selected day of the month or another month that indicates to unsubscribe from the third-party service;

present a subscription cost of the third-party service that is based on the first marker being placed on the first selected day and based on the second marker being placed on the second selected day;

allow a user to place (i) a third marker on a third selected day of the month that indicates to subscribe to an additional third-party service of the one or more third-party services and (ii) a fourth marker on a fourth selected day of the month or the other month that indicates to unsubscribe from the additional third-party service;

present an additional subscription cost of the additional third-party service that is based on the third marker being placed on the third selected day and based on the fourth marker being placed on the fourth selected day; and in response to selection of a month of the calendar interface, display at least the subscription cost of the third-party service, the additional subscription cost of the additional third-party service, and a corresponding cumulative subscription cost based at least on the subscription cost of the third-party service and the additional subscription cost of the additional third-party service.

* * * * *